United States Patent [19]

Strobel et al.

[11] 3,711,297

[45] Jan. 16, 1973

[54] PROCESS FOR THE TREATMENT OF UNCHLORINATED CAKE FLOUR

[75] Inventors: Rudolf G. K. Strobel, Corerain Township, Hamilton County; James P. Smith, North College Hill, both of Ohio

[73] Assignee: The Proctor & Gamble Company, Cincinnati, Ohio

[22] Filed: Dec. 29, 1970

[21] Appl. No.: 102,507

[52] U.S. Cl. ................................99/93, 99/94
[51] Int. Cl. ..........................A21d 6/00, A21d 2/02
[58] Field of Search....................................99/93, 94

[56] References Cited

UNITED STATES PATENTS 3,167,432    1/1965    Colby........................................99/93

Primary Examiner—Raymond N. Jones
Attorney—Richard C. Witte and Edmund J. Sease

[57] ABSTRACT

Raw, unchlorinated wheat flour is slurried with water at a flour to water ratio of 1:1 to 1:10 and a pH of 2.5 to 10.5. The slurry is incubated for 30 seconds to 35 minutes at 32°–98° F and then dried. When unchlorinated wheat flour which has been treated by the above process is used in baking cakes, the products exhibit good volume, texture, crumb color characteristics, and a moist melt-in-the-mouth quality.

8 Claims, No Drawings

3,711,297

PROCESS FOR THE TREATMENT OF UNCHLORINATED CAKE FLOUR

BACKGROUND OF THE INVENTION

This invention relates to a process for the treatment of wheat flour which can be used in baking cakes having good volume, texture, crumb color, and a moist melt-in-the-mouth quality.

Satisfactory cakes cannot be made from normal untreated wheat flour. Cakes made from untreated wheat flour exhibit poor volume and texture properties. For many years it has been the practice to use chlorinated or bleached wheat flour in cake-baking and particularly in prepared mixes. Cakes made from chlorinated wheat flour exhibit good volume and texture properties. Handling and use of chlorine gas or other chlorinating agents presents special problems of safety and corrosion. Thus, an effective substitute has been sought for the chlorinated method of treating wheat flour for use in cakes. A widely accepted and long-used European practice utilizes the natural wheat flour enzymes to obtain wheat flour with better baking characteristics. However, the European practice involves allowing the flour to stand in large bins for several months in as dry an environment as possible. Cakes baked with flour treated by the European process exhibit inferior volume and texture as compared to cakes baked with chlorinated wheat flour.

There have been other solutions to the problem of finding a substitute for chlorination of wheat flour. U.S. Pat. No. 3,404,985 discloses a liquid shortening containing polytitanyl stearate which is useful for the preparation of high volume cakes made with unchlorinated wheat flour. U.S. Pat. No. 3,490,917 discloses a substitute for chlorination where an unchlorinated cake flour containing a major portion of starch granules free or substantially free from enveloping gluten is heated for a period of time.

U.S. Pat. Nos. 987,560 and 1,262,144 show processes for making flour from maize and corn, respectively, by mixing the grain with a caustic, such as calcium hydroxide or lime, and water, boiling the mixture, and then grinding the grain to produce flour. These two patents are directed at the making of corn or maize flour and not at the treatment of wheat flour.

It is an object of this invention to produce wheat flour from which cakes of good volume, texture, crumb color, and a moist melt-in-the-mouth quality can be obtained. A further object of this invention is to provide a method of treating wheat flour which does not involve chlorination or bleaching. Yet another object of this invention is to provide a safer process than chlorination for treating wheat flour by obviating the necessity of handling chlorine gas or other chlorination agents. These and other objects will become apparent from the following description.

SUMMARY OF THE INVENTION

Briefly stated, this invention relates to a process for treating unchlorinated wheat flour so that cakes of good volume, texture, crumb color, and a moist melt-in-the-mouth quality can be produced from the treated flour.

Raw, unchlorinated wheat flour is slurried with water, hereinafter referred to as "treatment water," at a flour to treatment water ratio of 1:1 to 1:10 and a pH of 2.5 to 10.5. What is meant by slurrying is mixing the flour and the treatment water and stirring them for a short period of time. The flour-water slurry is incubated for 30 seconds to 35 minutes at a temperature of 32° to 98° F and then dried. What is meant by incubation is holding the flour-water slurry at a constant temperature for a period of time. The treated flour can then be incorporated into a dry prepared cake mix or can be used with other usual ingredients to bake cakes or other culinary products. The cakes baked with flour treated by the above process exhibit good volume, texture, crumb color characteristics, and a moist melt-in-the-mouth quality.

The flour-water slurries can be spray-dried, drum dried, freeze dried, or dried by any other appropriate method. The process may be batch or continuous. The flour can then be incorporated into a cake mix with sugar, shortening, leavening, and other minor ingredients to make a dry prepared cake mix. Cakes baked from such a mix or by some other suitable method which utilizes the above-described flour exhibit good volume, texture, crumb color characteristics, and a moist melt-in-the-mouth quality. The flour which can be used is any raw, unchlorinated wheat flour. Soft red and soft white wheat flour are preferred.

DETAILED DESCRIPTION OF THE INVENTION

In order to obtain cakes of good volume and texture, it is necessary that the starch granules in the wheat flour absorb water during the baking. The water referred to here is that which is added to the dry ingredients during the preparation of cakes. It will be hereinafter referred to as "baking water." It is theorized that each starch granule is surrounded by a lipid layer consisting primarily of triglycerides and polar lipids like phospholipids and di- and mono-galactosylglycerides. The outermost stratum of the lipid layer is thought to be relatively non-polar and hydrophobic. The hydrophobic characteristics of this layer prevent the passage of the baking water into the starch granules. If the starch granules do not absorb sufficient baking water during the baking process, the cakes made with such flour will have low volume, inferior texture, and poor eating quality.

Chlorination of flour makes the hydrophobic lipid layer surrounding the starch granules accessible to the emulsifiers added to the baking system so that the emulsifiers can act to remove enough of the lipid layer to permit sufficient baking water to be absorbed by the starch granules. Thus, the continuous protein matrix of the cake batter will be stabilized and the cakes will have good structure and volume. The starch granules, the gas cells, and small lipid droplets consisting of shortening and flour lipid components are dispersed in the protein matrix. If the hydrophobic lipid layer is not sufficiently removed from the starch granules, then the baking water will remain within the protein matrix. The wet protein matrix remains flexible and collapsible until sufficient baking water migrates from the protein matrix into the starch granules which in turn gel and thus contribute by means of physical expansion to the stability of the cake batter.

While not wishing to be bound by any theory, it is believed that the hereinbefore described water slurry treatment process of this invention allows the naturally occurring wheat flour enzymes, such as lipases, phospholipases, and lipoxidases, to react with the hydrophobic lipid layers surrounding the starch granules, thereby changing their chemical composition and physical properties so as to allow the baking water to be absorbed by the starch granules during the baking process. The slurry treatment provides a vehicle (the treatment water) for the enzymes to move about because they are water soluble or water dispersible. With this mobility, the various enzymes come into contact with the lipid layer surrounding the starch granules and can act to hydrolyze and/or oxidize the lipid layer.

It is theorized that the lipases act on the outermost stratum of the lipid layer, thus changing the non-polar, hydrophobic triglycerides into more polar and hydrophilic partial glycerides and free fatty acids. Thus, the outermost lipid layer is partially changed to compounds which are constituents of conventional emulsifiers. It is also theorized that the lipoxidases act on the outermost lipid layer to transform linoleic acid-containing lipid components, among other unsaturated fatty acid components, into peroxides and/or epoxides. Both oxides can then react with the amino and sulfhydryl groups present in proteins to change, by interaction of the two constituents, the hydrophilic protein and the hydrophobic lipid constituents into an amphiphilic emulsifier. It is also theorized that the phospholipases act on the inner stratum of the lipid layer. The hydrophilic, but not water soluble, phospholipids are transformed into water dispersible or water soluble compounds.

The slurry treatment fulfills two purposes. The first is to remove the hydrophobic neutral lipid layer from the starch granule to permit sufficient baking water to leave the protein matrix and be absorbed by the starch granules. The second is to produce partial glycerides, free fatty acids, lyso phosphatides, and lipoproteins (by the interaction of oxidized lipids with proteins). All four species are either emulsifiers themselves or are components of emulsifier systems. All four species aid in stabilizing the cell structure of the batter during baking.

If the flour to treatment water ratio is less than 1:1, the slurry is too pasty and the enzymes do not have sufficient mobility to effectively act on the lipid layers. If the flour to treatment water ratio is more than about 1:10, the cost of removing the treatment water makes the process uneconomical. The preferred balance between enzyme mobility and water removal is at a flour to treatment water ratio of 1:1.1 to 1:1.3.

The natural pH of a non-chlorinated flour water slurry is about 5.7. The pH can be raised by adding NaOH or lowered by adding acid. If the pH is lower than 2.5, the protein matrix is weak and the starch is not capable of absorbing the baking water during the baking process. The baked product has a lower volume and its texture is coarse. If the pH is higher than 10.5, the flour begins to decompose and darken in color, probably as a result of a browning reaction. The result is a baked product with an ammonia-like odor and a lower volume. Cakes with greater volume and finer texture are obtained in the preferred pH range of 8.5 to 10.

If the incubation is not carried out for at least 30 seconds, the lipid layers will not be sufficiently hydrolyzed and/or oxidized and cakes with lower volumes will be the result. If the incubation period is more than 35 minutes, the lipid layers will become hydrolyzed and/or oxidized to such a great extent that the texture of the cakes baked with flour so treated will be too coarse. The optimum practical incubation period for a continuous process is 5 to 15 minutes.

The activity of the enzymes is dependent upon temperature. It has been experimentally determined that the activity is insufficient to accomplish the necessary hydrolysis and/or oxidation of the lipid layers if the incubation temperature is above 98° F. The practical lower limit for a water system is 32° F. The best volume, texture, crumb color characteristics, and moist melt-in-the-mouth quality are obtained when the incubation temperature is from 32° to 37° F.

The flour treated by the process of this invention can be used to bake cakes in any conventional manner. Preferably, the treated flour can be used to make a dry prepared cake mix with sugar, shortening, leavening and other minor ingredients.

GENERIC RECIPE FOR CAKE MIXES CONTAINING TREATED FLOUR

| Ingredients | Percent By Weight |
|---|---|
| Flour | 30–45 |
| Sugar | 30–45 |
| Shortening | 5–20 |
| Leavening soda | 0.5–3 |
| Leavening acid | 0.2–1.5 |
| Salt | 0–2 |
| Flavoring, coloring, water binders, milk solids | Balance |

Shortenings which can be employed in such prepared cake mixes include solid or plastic, as well as liquid or semifluid glyceride shortenings derived from animal, vegetable or marine fats and oils, including synthetically prepared shortenings. Any shortening normally used in baked goods can be used. A more detailed description of suitable shortenings is found in commonly assigned, copending application, "Cake Mixes for Preparing Large, Delectable Cakes," Arlee A. Andre, Ser. No. 623,212, filed Mar. 15, 1967, which is incorporated herein by reference.

The sugar can be any of the commonly used granular sugars such as sucrose, dextrose, maltose, fructose, lactose, and brown and invert sugars. The sugar can also be in powdered form. Mixtures of more than one type of sugar can be used. Sucrose and dextrose, alone or in admixture, are the preferred sugars for use herein.

The dry prepared mixes contain leavening soda. The minimum amount of leavening soda is important. Too little leavening soda provides insufficient leavening to sustain the high volume of the cakes prepared from these mixes and thus results in improperly formed and/or low volume cakes. Suitable leavening sodas are sodium, potassium, or ammonium bicarbonate.

The cake mixes can contain a leavening acid. The use herein of slow-acting leavening agents (such as sodium aluminum phosphate, dicalcium heat-treated, or gluconodeltalactone, as compared to a conventional leavening acid such as sodium acid pyrophosphate), is preferred for the formation of high volume and well structured cakes if the cakes are made from highly emulsified, low sugar/flour ratio mixes. Sodium aluminum phosphate is the preferred leavening acid. The term "sodium aluminum phosphate" is used generically herein to embody all of the various forms of sodium aluminum phosphate, e.g., heat-treated, hydrated, and potassium-containing forms of this material. Suitable sodium aluminum phosphates are described in U.S. Pat. Nos. 2,957,750, 2,995,421, 3,041,177, 3,205,073, and in British Pat. Nos. 1,033,022 and 1,033,023.

The dry prepared cake mixes of this invention are conveniently prepared, for example, by blending the above-described flour, sugar, and shortening into a homogeneous premix in a paddle mixer, and then passing this premix through a four-roll mill. The remaining ingredients can then be added. This combination can be mixed in a paddle mixer or ribbon mixer and then passed through an entoleter to form a smooth, free-flowing finished mix. This method of preparing a dry prepared mix is disclosed in U.S. Pat. Nos. 2,874,051-053. Another preferred method for preparing these dry mixes is disclosed in Ewing, et al., U.S. Pat. No. 3,508,928, issued Apr. 28, 1970, and Callaghan, et al., U.S. Pat. No. 3,508,929, issued Apr. 28, 1970.

For many mixes it is accepted practice for the housewife to add the required amount of eggs to the mix in the course of batter preparation, and this practice can be followed with the mixes of this invention. If desired, the inclusion of egg solids in the mix is an allowable alternative. The function of and permissible variations in the remaining ingredients are apparent to those skilled in the art. For example, various amounts of ingredients such as flavors, colors, water binders, a hydrophilic colloid such as carboxymethyl cellulose, salt and the like can be added if desired. Suitable water binders can include natural gum materials such as guar gum, gum tragacanth, locust bean gum, algin, gelatin, Irish Moss, pectin, and gum arabic. Synthetic binder materials such as water-soluble salts of carboxymethyl cellulose can also be used.

The dry prepared mixes are conveniently prepared into cakes by forming a batter by mixing the dry mix in a household electric mixer, for example, for 2 minutes at medium or high speed, after having added baking water or other aqueous liquid and eggs or egg whites to the mix. The batter resulting from the mixing process is poured into a cake pan and baked, for example, for 25 to 40 minutes at 350° to 425° F.

The practice of this invention is shown by the following examples, which are meant only to illustrate the invention and not to limit it in any way.

EXAMPLE I

Unbleached soft red wheat flour is slurried with treatment water at a flour to water ratio of 1:1 in the large bowl of a Sunbeam mixer using a speed setting of No. 2 (about 200 rpm). The temperature of the slurry is held at 35° F. After the flour particles are dispersed and the slurry appears uniform, the electrodes of a pH meter are immersed in the slurry. While continuing the mixing, the pH of the slurry is adjusted to 9.0 with 1 normal NaOH. The total mixing time is 5 minutes.

The slurry is then poured into pans and freeze-dried. The freeze-dried flour is milled to reduce the particle size so that the flour is suitable for cake baking.

The following is the recipe to be used to bake white cakes with the treated flour from above:

| | |
|---|---|
| 107.0 grams | Treated soft red wheat flour |
| 133.0 grams | Industrial fine cane sugar |
| 2.5 grams | Table salt |
| 6.7 grams | "Calumet" double-acting baking powder |
| 2.5 cc | Vanilla extract |
| 130.0 grams | Whole milk |
| 60.0 grams | Fresh egg white |
| 47.5 grams | Shortening* |

*84% of an oil comprised of 77.8 parts refined soybean oil, 11 parts refined cottonseed oil, 6.7 parts hydrogenated palm oil, and 4.5 parts vegetable-based monoglyceride; 14% propylene glycol monostearate; and 2% stearic acid The dry ingredients are placed in a small Sunbeam mixing bowl. The milk-egg mixture and the shortening are added while the Sunbeam mixer is operating on speed No. 1 (about 100 rpm). When all of the ingredients have been added and the baking water has been added to the dry ingredients, the mixer speed is increased to speed No. 5 ½ (about 500 rpm), and mixing is continued for 4 minutes. During mixing, the sides of the bowl must be scraped frequently. 400 grams of batter is placed in a greased and lined 8-inch round cake pan and is baked for 25 minutes at 365° F. The resulting cake exhibits excellent volume, texture, crumb color characteristics, and a moist melt-in-the-mouth quality.

The same procedure is followed except that the treated flour is spray-dried. Similar results are achieved.

EXAMPLES II-IV

The procedure of Example I is followed, but the pH used is changed to 8.5, 9.5, and 10 in successive examples. In all three cases, the resulting cake exhibits excellent volume, texture, crumb color characteristics, and a moist melt-in-the-mouth quality.

EXAMPLES V-XI

The procedure of Example I is followed, but the pH is changed to 10.5, 8, 7.5, 7, 6.5, 6, and 5.7 in successive examples. In all cases, the resulting cake exhibits good volume, texture, crumb color characteristics, and a moist melt-in-the-mouth quality.

EXAMPLES XII-XVII

The procedure of Example I is followed except that the pH is adjusted, using 1 normal HCl, to 5, 4.5, 4, 3.5, 3, and 2.5 in successive examples. In all cases, the resulting cake exhibits good volume, texture, and crumb-color, and a moist melt-in-the-mouth quality.

EXAMPLE XVIII

The procedure of Example I is followed, but the temperature of the slurry is changed to 98° F. The resulting cake exhibits good volume, texture, crumb color characteristics, and a moist melt-in-the-mouth quality.

EXAMPLE XIX

A dry prepared cake mix with the following composition:

| Ingredient | % of Total Mix |
|---|---|
| Granulated sugar | 39.52 |
| Treated flour sample | 39.12 |
| Shortening* | 11.00 |
| Dextrose | 3.34 |
| Milk solids | 4.70 |
| Salt | 0.75 |
| Soda | 0.70 |

| | |
|---|---|
| Sodium aluminum phosphate | 0.72 |
| Vanilla | 0.15 |
| Total: | 100.00 |

*87.0% of a plastic shortening comprised of 85 parts refined soybean oil, 6 parts refined cottonseed oil, and 9 parts hydrogenated palm oil; 10.0% lactic acid emulsifier; and 3.0% rapeseed monoglyceride.

is prepared by blending the treated flour sample of Example I, sugar, and shortening into a homogeneous premix in a paddle mixer, and then passing the premix through a four-roll mill. The remaining ingredients are then added and the combination is mixed in a paddle mixer and passed through an entoleter to form a smooth, free-flowing finished mix.

A cake batter is prepared by adding two whole eggs and 1 and ⅓ cups of water to 531 grams of dry mix. The batter is then mixed in a Sunbeam mixer at speed No. 5 (about 450 rpm). 400 grams of batter is placed in a greased and lined 8 inch round cake pan and is baked for 25 minutes at 365° F. The resulting cake exhibits excellent volume, texture, crumb color characteristics, and a moist melt-in-the-mouth quality.

What is claimed is:

1. A process for producing unchlorinated wheat flour suitable for making cakes of good volume, texture, crumb color, and a moist melt-in-your-mouth quality which consists essentially of the steps of:
    a. slurrying raw, unchlorinated wheat flour with water at a flour to water ratio of from 1 to 1 to 1 to 10, the pH of the slurry being from 2.5 to 10.5;
    b. incubating said slurry for 30 seconds to 35 minutes at a temperature of from 32° to 98° F., and
    c. drying the flour.

2. The process of claim 1 comprising the additional step (d) of mixing the flour with sugar, shortening, and leavening to make a dry prepared cake mix.

3. The process of claim 2 wherein the pH is from 8.5 to 10.

4. The process of claim 2 wherein the incubation time is from 5 to 15 minutes.

5. The process of claim 2 wherein the temperature is from 32° to 37° F.

6. The process of claim 2 wherein the flour to water ratio is from 1 to 1.1 to 1 to 1.3.

7. The process of claim 2 wherein the flour is soft red wheat flour.

8. The process of claim 2 wherein the flour is soft white wheat flour.

* * * * *